United States Patent
Lu et al.

(10) Patent No.: US 11,858,200 B2
(45) Date of Patent: Jan. 2, 2024

(54) IN-SITU 4D PRINTING OF HIGH-TEMPERATURE MATERIALS

(71) Applicant: City University of Hong Kong, Hong Kong (HK)

(72) Inventors: Jian Lu, Hong Kong (HK); Guo Liu, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 61 days.

(21) Appl. No.: 17/500,934

(22) Filed: Oct. 13, 2021

(65) Prior Publication Data

US 2023/0115347 A1 Apr. 13, 2023

(51) Int. Cl.
| | |
|---|---|
| B33Y 10/00 | (2015.01) |
| B29C 64/135 | (2017.01) |
| B33Y 80/00 | (2015.01) |
| B29K 83/00 | (2006.01) |
| B33Y 70/10 | (2020.01) |

(52) U.S. Cl.
CPC ............ B29C 64/135 (2017.08); B33Y 10/00 (2014.12); B33Y 80/00 (2014.12); B29K 2083/00 (2013.01); B33Y 70/10 (2020.01)

(58) Field of Classification Search
CPC ..... C03C 15/00; C03C 17/34; C03C 17/3405; C03C 17/3411; C03B 33/04; C03B 33/09; B29C 64/135; B29C 64/141; B29C 64/10; B29C 64/106; B29C 64/118; B29C 64/336
See application file for complete search history.

(56) References Cited

U.S. PATENT DOCUMENTS

| | | | | |
|---|---|---|---|---|
| 2011/0229667 A1* | 9/2011 | Jin | ...................... | B81C 1/00206 216/2 |
| 2013/0323415 A1* | 12/2013 | Brackley | ................ | B41M 5/007 427/171 |
| 2015/0064479 A1* | 3/2015 | Ming | ....................... | C03C 8/14 428/428 |

(Continued)

FOREIGN PATENT DOCUMENTS

| | | |
|---|---|---|
| CN | 109320248 A | 2/2019 |
| CN | 109678527 A | 4/2019 |

(Continued)

OTHER PUBLICATIONS

First Office Action of the corresponding China patent application No. 202211077511.4 dated Jul. 13, 2023.

*Primary Examiner* — Joseph S Del Sole
*Assistant Examiner* — Margaret B Hayes
(74) *Attorney, Agent, or Firm* — Idea Intellectual Limited; Margaret A. Burke; Sam T. Yip

(57) ABSTRACT

The present invention provides a method of in situ 4D printing of high-temperature materials including 3D printing a structure of an ink including a precursor. The structure is treated with controlled high energy flow to create a portion which has a different coefficient of thermal expansion/thermal shrinkage ratio. The structure is heated and the difference in the coefficient of thermal expansion creates an interface stress to cause a selected level of deformation. Alternatively, two structures with different coefficients of expansion/thermal shrinkage ratio may be printed. Thermal treatment of the two structures creates an interface stress to cause a selected level of deformation.

14 Claims, 22 Drawing Sheets

(56) References Cited

U.S. PATENT DOCUMENTS

| | | | | |
|---|---|---|---|---|
| 2016/0163901 A1* | 6/2016 | Hsia | ................. | H01L 31/0682 |
| | | | | 106/287.18 |
| 2017/0151733 A1 | 6/2017 | Lewis et al. | | |
| 2019/0030783 A1 | 1/2019 | Lu et al. | | |
| 2019/0381691 A1 | 12/2019 | Lu et al. | | |
| 2019/0381725 A1 | 12/2019 | Lu et al. | | |
| 2020/0023569 A1* | 1/2020 | Hoa | ................. | B29C 61/0658 |

FOREIGN PATENT DOCUMENTS

| | | | |
|---|---|---|---|
| CN | 110587775 A | | 12/2019 |
| CN | 110606750 A | | 12/2019 |
| CN | 113461427 A | | 10/2021 |
| WO | WO-2021046615 A1 | * | 3/2021 |

* cited by examiner

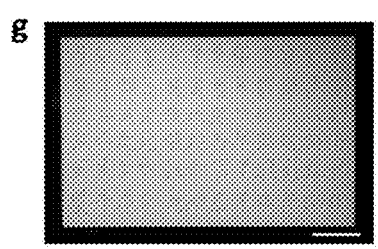
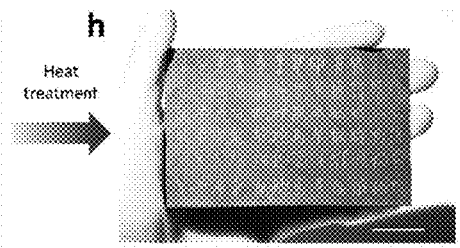
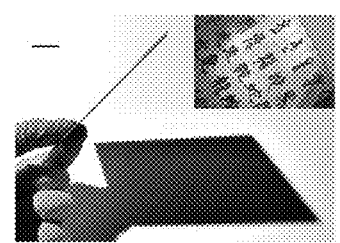
Fig. 2g    Fig. 2h    Fig. 2i
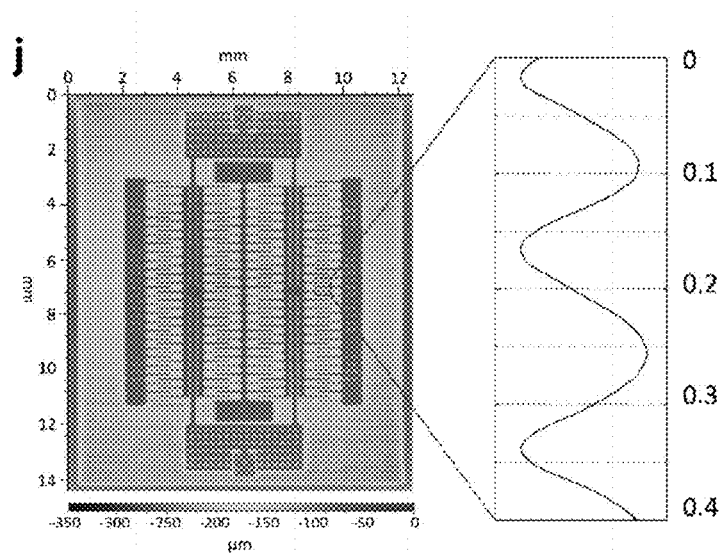
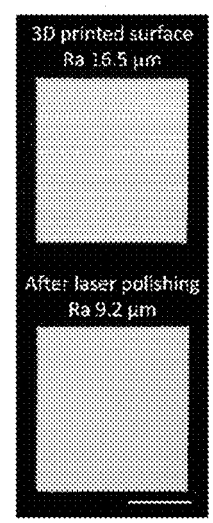
Fig. 2j    Fig. 2k

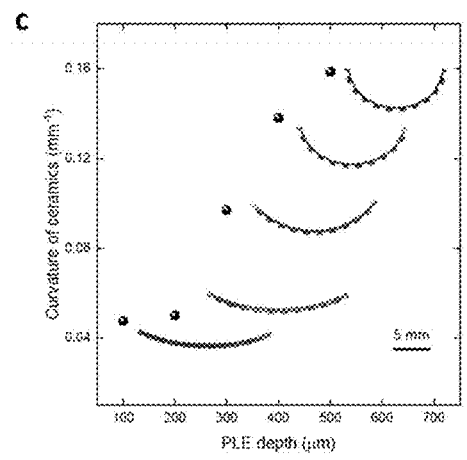
Fig. 3c
Fig. 3d
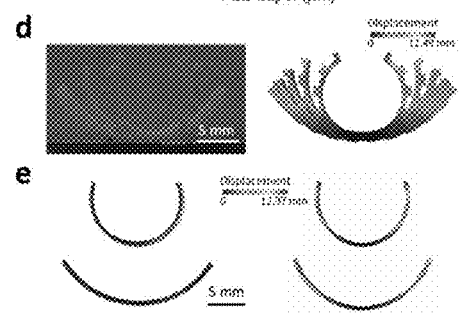
Fig. 3e

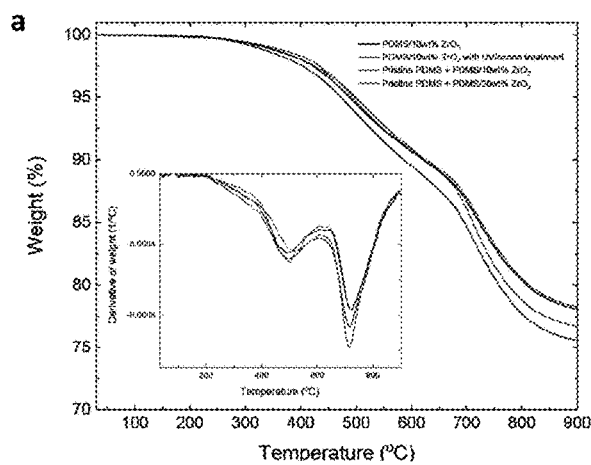
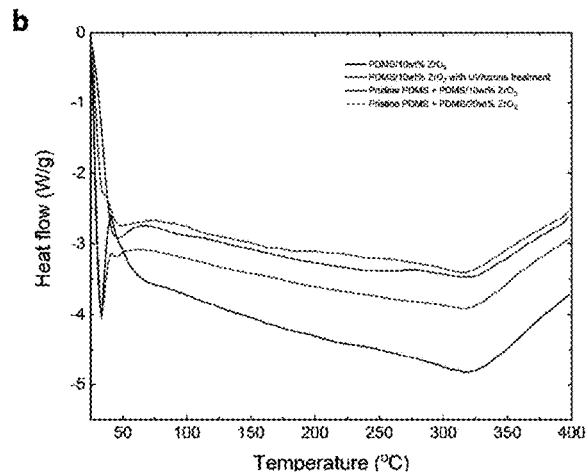
Fig. 8a
Fig. 8b
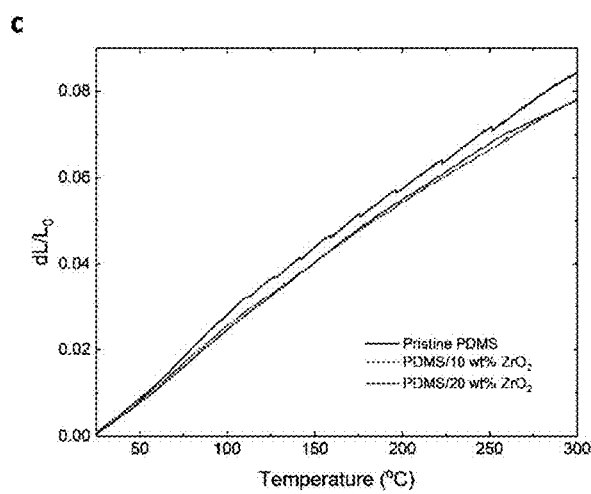
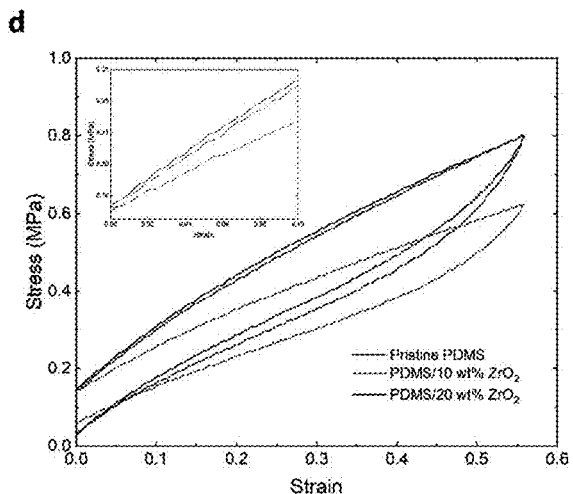
Fig. 8c
Fig. 8d

IN-SITU 4D PRINTING OF HIGH-TEMPERATURE MATERIALS

FIELD OF THE INVENTION

The present invention concerns methods and materials for in situ 4D printing of high-temperature materials.

BACKGROUND

Additive manufacturing of structural materials is an area of active research that is growing rapidly into multidisciplinary areas. Some three-dimensional (3D) printing systems reported to date have achieved improvements in printing speed and scalability. However, for many materials, there exists a trade-off between printing resolution versus printing scalability/speed. The integration of additive and subtractive manufacturing is promising for eliminating this trade-off. The hybrid additive-subtractive manufacturing concept could offer opportunities for the development of rapid, precise, and scalable 3D printing technologies.

The extremely high melting points of high-temperature materials hinder the development of corresponding 3D printing systems. The invention of printable polymeric precursor materials opens the door to a broad range of 3D printing technologies for high-temperature materials such as ceramics and glasses. The integration of polymer-derived ceramics and additive manufacturing has enabled breakthroughs in geometrical flexibility and mechanical properties. It was recently shown that 3D printed polymer-derived ceramic structures are becoming larger and the manufacturing speed is becoming faster. Four-dimensional (4D) printing has boomed with the involvement of versatile morphing systems. The first ceramic 4D printing system was developed in 2018, and with it, elastomer-based ceramic precursors were printed, deformed, and then transformed into ceramic structures. However, the low precision and time-consuming processing steps with separate shape and material transformations in the current ceramic 4D printing system limit its practical applications. Hence, a new strategy with synergies between geometrical flexibility, manufacturing speed, manufacturing resolution, and manufacturing scalability is needed for the further development of 4D printing for high-temperature materials.

SUMMARY OF THE INVENTION

The present invention provides a high-resolution (as high as 35 μm; four times as high as the previous ceramic 4D printing system), scalable (as large as 12 cm), and rapid (as fast as 1,000° C. min$^{-1}$; 40 times as fast as the previous ceramic 4D printing system) in situ 4D printing of high-temperature structural materials (FIG. 1a-1b). The precursors were obtained by 3D printing of selected ink systems, and versatile methods may be utilized to generate heterogeneous structural materials. Heterogeneous materials include domains that have dramatically different physical and mechanical properties. Similar to natural heterogeneous materials such as nacres, bones, bamboo, and soils, engineering of synthetic heterogeneous materials achieves superior synergy in properties that are not accessible to their homogeneous counterparts. Two representative heterogeneous material engineering methods are demonstrated in the present invention (FIG. 1a). In method 1, a laser machining technique is applied to generate high-resolution features and then tune the stiffness of the structures. Next, a thin film is created on the surface of the sample, whose thickness is tuned by changing the processing time in a UV/ozone system. The UV/ozone film on the elastomeric polymers has potential application to other 2D additive manufacturing materials such as metal films to achieve heterogeneous precursors.

During the following heat treatment step, the thermal expansion and thermal shrinkage of the 2D UV/ozone film and 3D printed precursor materials are different, and this heterogeneity results in a shape transformation of the precursor structures. Similarly, multi-material printing can be also applied to generate this type of material and structural heterogeneity, as illustrated in method 2 (FIG. 1a). Moreover, this heterogeneity design of precursors for 4D printing is applicable to various high-temperature structural materials, including ceramics, SiOC glasses, Fe alloys, diamonds and their composites, as demonstrated herein (FIG. 1B). Engineered metallic and diamond materials with the capability of large deformation offer the potential for the performance enhancement, and thus wider application, of high-temperature structural materials.

In one aspect, the present invention provides a method of in situ 4D printing of high-temperature materials including 3D printing a structure from an ink including a polymeric ceramic precursor. The structure is treated with controlled high energy to create a portion which has a different coefficient of thermal expansion/thermal shrinkage ratio. The structure is heated and the difference in the coefficient of thermal expansion creates an interface stress to cause a selected level of deformation. Alternatively, two structures with different coefficients of expansion/thermal shrinkage ratio may be printed. Thermal treatment of the two structures creates an interface stress to cause a selected level of deformation.

BRIEF DESCRIPTION OF THE DRAWINGS

FIGS. 2a-2m show high-resolution and scalable hybrid additive-subtractive manufacturing. FIG. 2a is a schematic representation of precursor laser engraving (PLE) method. FIG. 2b shows that the engraved depth was precisely adjusted by laser power and laser speed. The depth resolution along the X and Y axes reaches 50 μm. FIG. 2c is a TEM image showing that the nanoparticles with primary sizes of 20-50 nm; FIG. 2d shows a uniform distribution in resultant ceramics Scale bars: 500 nm (FIG. 2c); 50 nm (FIG. 2d). FIGS. 2e-2f are high-resolution TEM images showing that with induction heat treatment at 1,300° C. the ceramic precursors and glass precursors are transformed into amorphous-crystalline dual-phase ceramics (FIG. 2e) and amorphous glasses (FIG. 2f), respectively. Scale bars: 10 nm FIGS. 2g and 2h show laser-engraved precursors (2g) were transformed into ceramics (2h) with uniform linear shrinkage (30%) and good structural retention. Scale bars, 2 cm. FIG. 2i shows the shape deformation of the large-scale (12 cm in length) ceramic flat plate was well controlled during the polymer-to-ceramic transformation. The inset image exhibits metallic luster after polishing. Scale bar, 2 cm. FIG. 2j shows laser-engraved ceramic precursor MEMS structures with a resolution as high as 80 μm. FIG. 2k, shows PLE used for polishing 3D printed ceramic precursors, resulting in polishing of 3D printed ceramic structures via polymerto-ceramic transformation. Scale bar, 5 mm FIGS. 2*l*-2*m* show XRD results and digital images (inset) of PLE-ed Fe alloys (2*l*) and diamonds (2*m*) demonstrating that PLE is a general strategy for hybrid additive-subtractive manufacturing of high-temperature structural materials. Scale bars, 5 mm.

FIGS. 3*a*-3*i* depict in situ 4D printing of ceramic and ceramic/glass composites. FIG. 3*a*-3*b* show a video recording of shape and material transformation of 3D printed ceramic precursor structures generated with method 1 (3*a*) and ceramic/glass composite precursor structures generated with method 2 (3*b*). FIG. 3*c* depicts the influence of PLE depth of precursor in method 1 on the curvature of resultant ceramic structures. FIGS. 3*d*-3*e* show that the FEA simulation results were consistent with the experimental results for the thermal expansion process in method 1 (3*d*) and the thermal shrinkage process in method 2 (3*e*). FIG. 3*f* show that the balance between thermal expansion and shrinkage effects serves as the mechanism for in situ 4D printing of high-temperature structural materials. FIG. 3*g* shows 4D printing of ceramic/glass composite saddle surface with negative Gaussian curvatures (K<0). FIG. 3*h* shows 4D printing and integrated shaping for an all-ceramic turbine blisk. FIG. 3*i* shows a 4D printed large-scale all-ceramic turbine blisk.

FIG. 7*b* shows that the ceramic structures can be 4D printed in seconds with an ultrafast (~1,000° C. min$^{-1}$) induction heating process.

FIGS. 8*a*-8*d* depict thermal and mechanical characterization of the precursors. FIGS. 8*a*-8*b* show TGA (8*a*) and DSC (8*b*) results of precursors in method 1 and method 2 showing that the polymer-to-ceramic transformations occur at temperatures above 300° C. FIG. 8*c* depicts the thermal expansion behaviors of precursors at temperatures below 300° C. FIG. 8*d* shows the tension behaviors of precursors. The inset shows the region of 0-10% strain in the loading process to generate the corresponding young's modulus.

FIG. 10*a* is a 4D printed ceramic/glass composite sinusoidal surface with zero Gaussian curvature (K=0). The precursor consisted of three layers with the inks for the top and bottom layers marked in the digital image. The middle layer was printed with the ink of PDMS/10 wt % $ZrO_2$. FIG. 10*b* is a 4D printed ceramic/glass composite cap surface with positive Gaussian curvature (K>0). FIG. 10*c* demonstrates that 4D printed samples showed good repeatability.

FIGS. 12*a*-12*b* are portions of a video recording of 4D printing of ceramic/glass composite saddle surface via method 2 with the printed line width of 7.5 mm (12*a*) and 3.75 mm (12*b*), respectively.

DETAILED DESCRIPTION

Hybrid Manufacturing of Precursors

The present invention relates to heterogeneous engineering of precursors through surface treatment of printed precursor material to create a film made of a different material, or through multi-material printing with different precursor materials, whereby heterogeneous precursors are formed; heating of heterogeneous precursors with the shape transformation due to the differences in thermal expansion coefficient or thermal shrinkage ratio of heterogeneous precursors accompanying the material transformation to high-temperature materials, whereby in situ 4D printed high-temperature materials are formed.

Figure 1A:
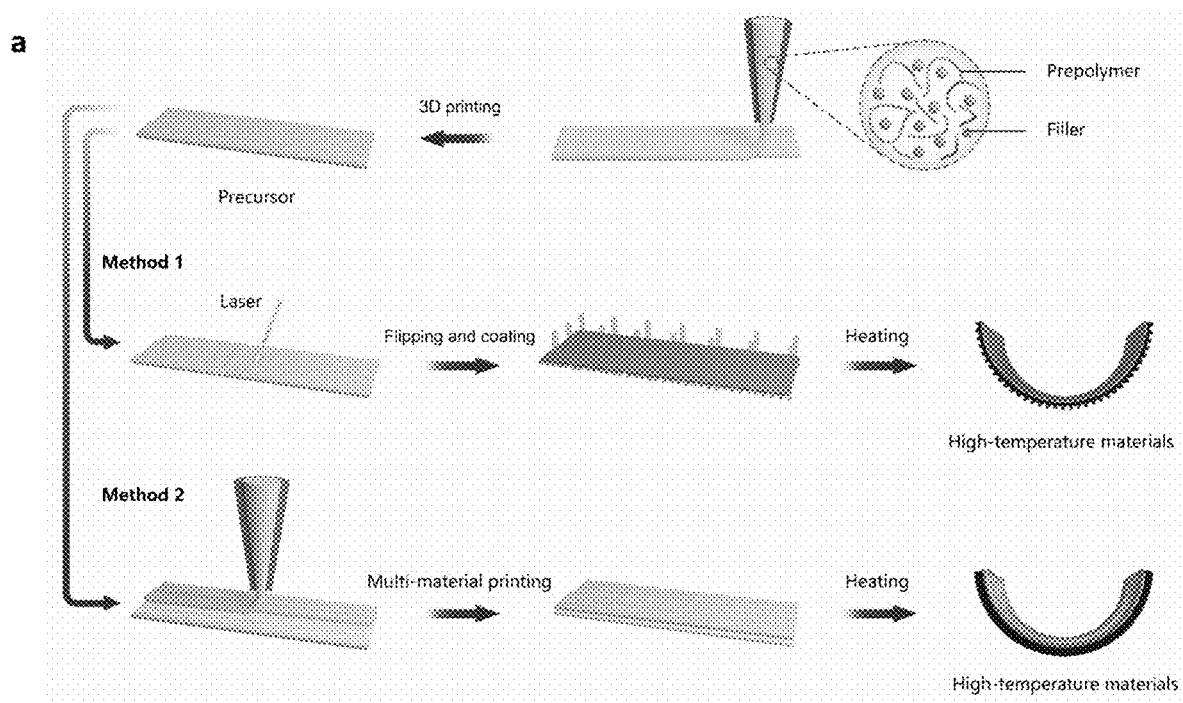
FIG. 1a is a schematic of heterogeneous engineering and in situ 4D printing of high-temperature structural materials.
Figure 1B:
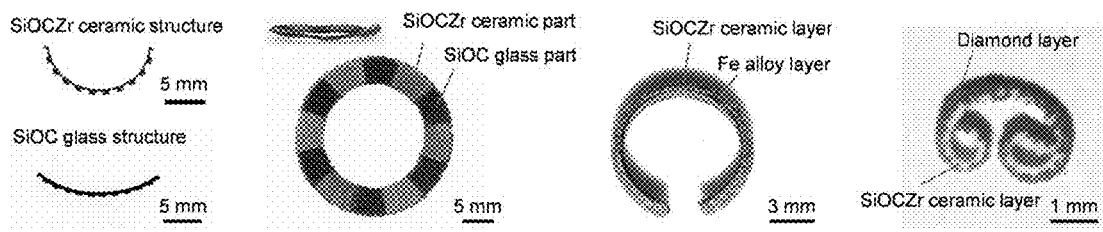
FIG. 1b shows five representative types of 4D printed structural materials demonstrating that the present invention provides a generalizable paradigm for high-temperature materials.

To improve the precision of manufacturing, laser machining was integrated with 3D printing, resulting in a high-resolution hybrid additive-subtractive manufacturing system. 3D printed precursors are laser engraved with a laser scanning strategy that was tuned by laser scanning power and speed, and then high-resolution high-temperature structural materials were obtained with a heat treatment processes. FIG. 1*a* depicts two processes for formation of shaped ceramic materials. In the first process, an ink formed of a polymeric ceramic precursor and optional ceramic particle filler is printed in a desired shape by 3D printing. Following 3D printing, shaping of the printed ink is performed by a shaping technique such as laser engraving. Following shaping, material treatment in a selected atmosphere, such as oxygen or ozone, optionally coupled with UV, is performed. This yields a coated, shaped printed material. Finally, heating is performed to decompose the polymeric ceramic precursor and sinter the coated, shaped, and printed material to yield the final ceramic article.

In general, the printing ink containing a polymeric precursor and optional particles. Particles may include ceramic, glass, metal, diamond or other suitable fillers. A variety of ceramic particles may be used including, but not limited to, alumina ($Al_2O_3$), zirconia ($ZrO_2$), titania ($TiO_2$), silicon nitride ($Si_3N_4$), calcium oxide (CaO), silicon carbide (SiC), yttria ($Y_2O_3$), or aluminum nitride (AlN). Metal particles include, but are not limited to, iron, titanium, and nickel. In one aspect, the particles may have a particle size ranging from approximately 1 nm to 100 microns. The polymeric ceramic precursor may be selected from a polysiloxane, including polyborosiloxanes and polycarbosiloxanes. Polymers that include Si—N bonds may be used such as polysilazane and poly(organosilylcarbodiimide). Other polymeric ceramic precursors include silica hydrogels and other silicon-containing polymers. An exemplary polymeric ceramic precursor used in the examples below is polydimethylsiloxane (PDMS) or cellulose. In general, the combination of polymeric ceramic precursor and ceramic particles may be selected based on a desired level of shrinkage during sintering, depending upon the desired final product shape.

In the second process (method 2) shown in FIG. 1*a*, a selected polymeric ceramic precursor ink (with or without particle filler) is deposited as a first layer by 3D printing. A second layer is deposited by printing having different materials or different amounts of materials such that the drying and shrinkage behavior of the first and second layers is different from one another. In this method the first and second layers may be different precursor materials, or the same precursor material filled with different filler particles, or the same precursor material filled with different amounts of the same filler particles.

The layered approach permits an article designer to create different properties, layer by layer. The different shrinkage properties of the different material layers create a controlled deformation during the heat treatment to decompose the polymeric ceramic precursor/sinter ceramic or metal particles. Composite materials may be formed (for example, metal-ceramic composites) through the layered approach.

Figure 2A:
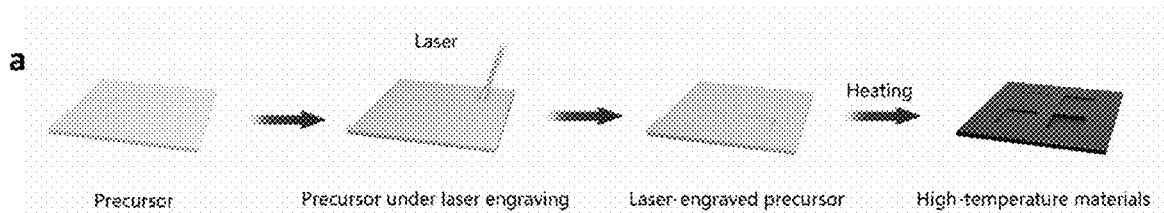
Figure 2B:
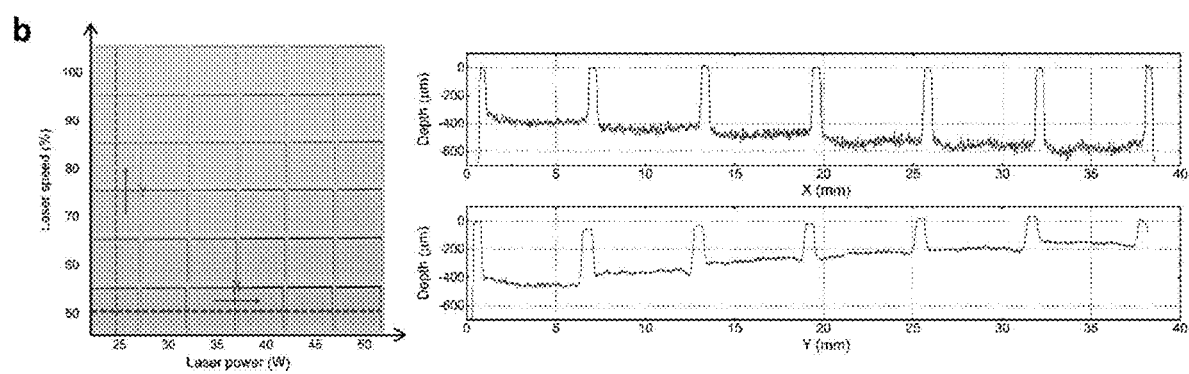
Figures 2C, 2D, 2E, 2F:
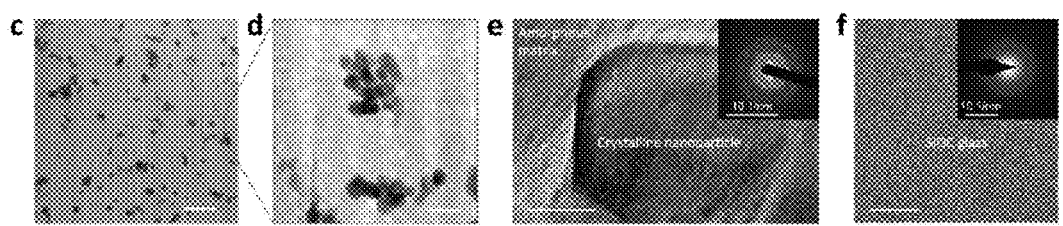

With the selection of novel precursor material systems and the precursor laser engraving (PLE) method, the laser machining process can be cost-efficient, high-resolution, and environmentally friendly, which enables the building of complex and precise high-temperature structural materials. A mapping model for varying laser scanning power and laser scanning speed is established. It shows that relatively deep features are generated by increasing laser scanning power and decreasing the laser scanning speed, and the depth of the features may be precisely adjusted with a step of around 50 μm (35 μm after ceramization; four times better than the direct ink writing process) (FIG. 2b). The precursors are transformed into either amorphous-crystalline dual-phase ceramics (FIGS. 2c-2e) or amorphous glasses (FIG. 2f) with proper heat treatments. The resultant ceramics and glasses had average compositions of $SiO_{0.74}C_{0.43}Zr_{0.18}$ and $SiO_{0.59}C_{0.25}$, respectively, as measured by energy-dispersive spectroscopy (EDS).

Resolution-Scalability Synergy

Figures 2L, 2M:
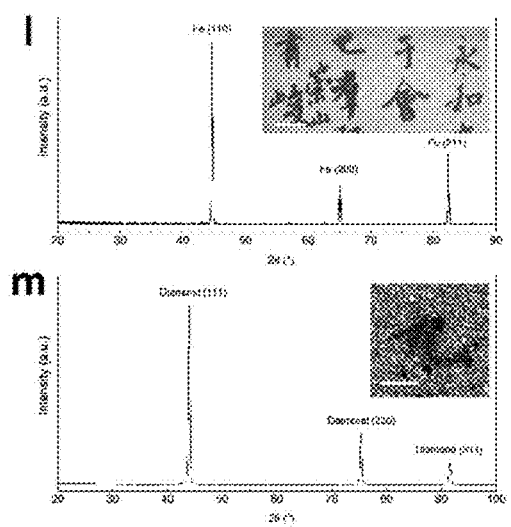
Figure 5:
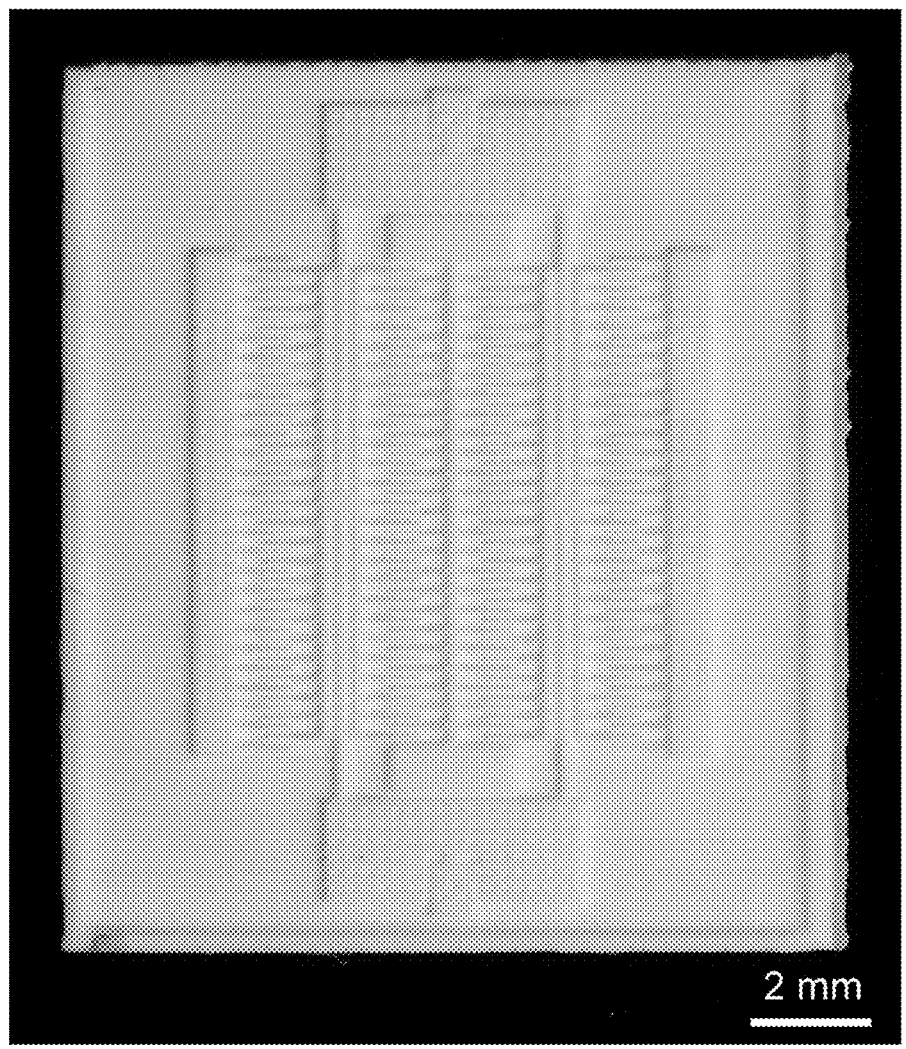
FIG. 5 shows the laser-engraving of additive-manufactured ceramic precursor MEMS structures with a resolution as high as 80 μm.
Figures 6A, 6B, 6C:
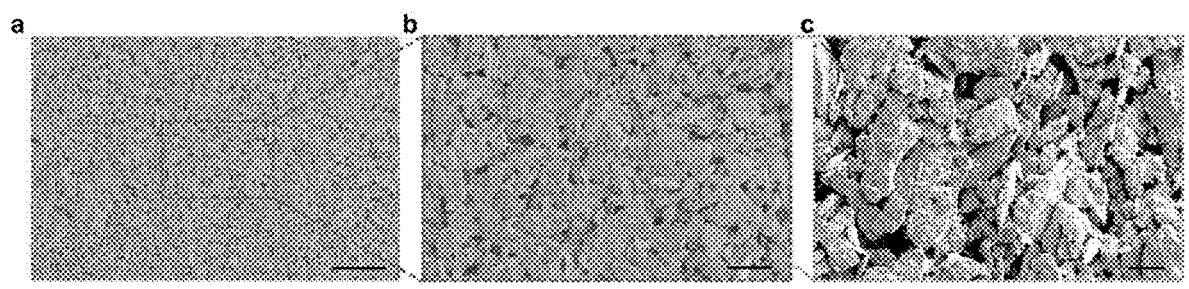
FIGS. 6*a*-6*f* show SEM images of Fe alloys (FIGS. 6*a*-6*c*) and diamonds (FIGS. 6*d*-6*f*) used in PLE method. Scale bars, 200 μm (6*a*); 50 μm (6*b*, 6*e*); 20 μm (6*c*); 100 μm (6*d*); 10 μm (6*f*).
Figures 6D, 6E, 6F:

The hybrid additive-subtractive manufacturing system of the present invention achieved resolution-scalability synergy. A typical microelectromechanical systems (MEMS) resonant strain sensor based on a double-ended tuning fork (DETF) was built (FIG. 2j and FIG. 5). The printed ceramic MEMS resonant strain sensors based on DETF offer potential for high-sensitivity strain sensing applications in harsh engineering environments. The PLE method can also be applied in the post-processing of 3D printed structures. The surface roughness Ra of a pristine 3D printed ceramic precursor structure was 16.5 μm, and it was reduced by 44% (to 9.2 μm) after laser engraving (FIG. 2k). Moreover, the surface roughness of the resultant ceramic structure was further improved by uniform linear shrinkage during polymer-to-ceramic transformation. After polymer-to-ceramic transformation, the large-scale (as large as 12 cm) ceramic plates remained flat with a uniform shrinkage of 30%, resulting in good retention of the global shape and local features (FIG. 2g-2i). The method offers great potential for applications of engineering ceramics in fields like astronautics, aeronautics, bioimplants, and electronics. The negative engraving of Chinese traditional calligraphy characters on a Fe alloy (FIG. 2l and FIG. 6a) and diamond (FIG. 2m and FIG. 6b) plates illustrates the universality of this hybrid additive-subtractive manufacturing method. The resultant Fe alloys had an average composition of $Fe_{45}O_{39}C_{16}$, as measured by EDS.

In Situ 4D Printing

Figure 3A:
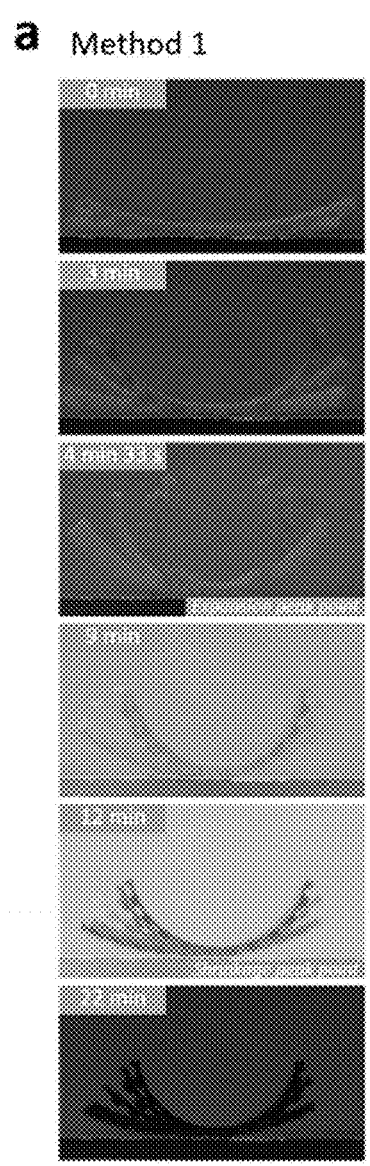
Figure 3B:
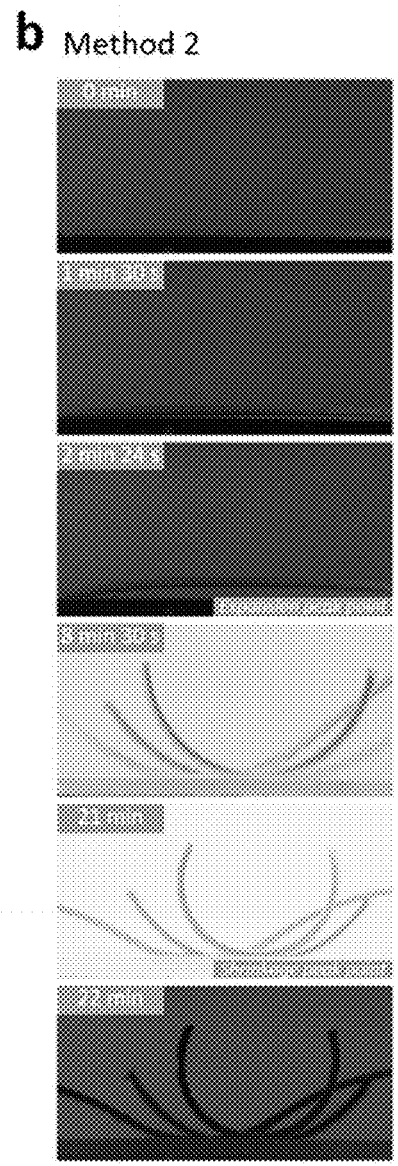
Figure 7A:
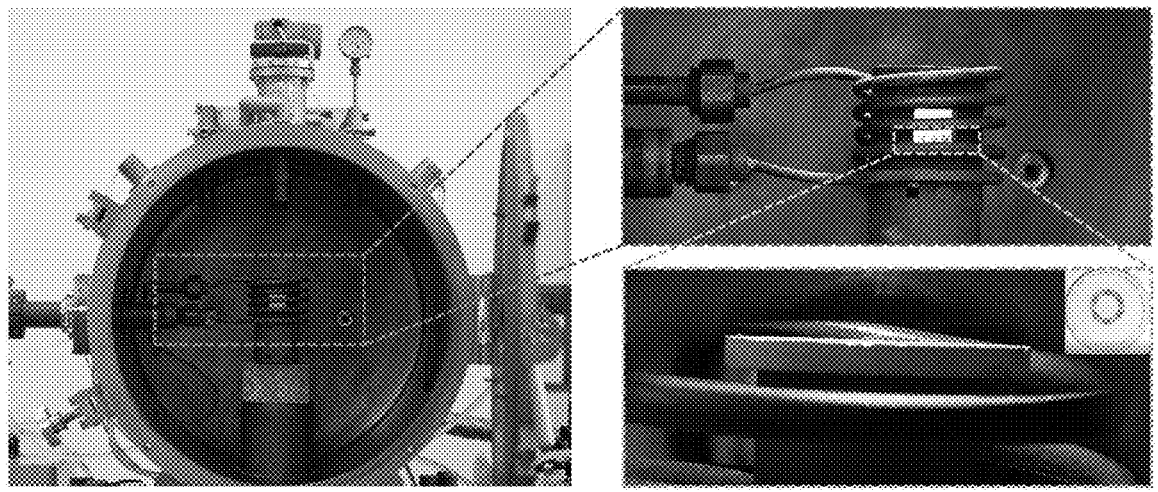
FIGS. 7*a*-7*b* show digital images of an induction heating furnace and its corresponding setup.
Figure 7B:
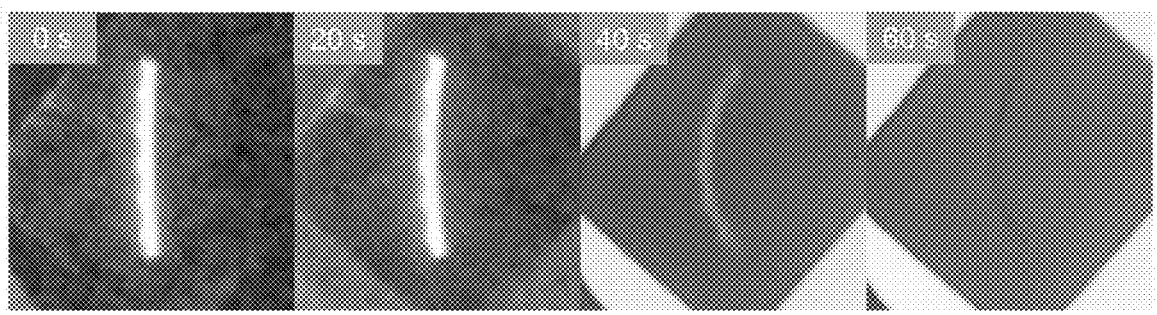

The rapid polymer-to-ceramic transformation of heterogeneous structural precursors was conducted in an induction heating furnace (FIG. 7). An induction heating technique was applied, and a video recording was taken of the resulting rapid 4D shape transformation to enable the mechanism analysis of in situ high-temperature 4D printing. The heating rate was as fast as 100-1,000° C. $\min^{-1}$, which was 10 to 100 times faster than conventional resistance heating approaches (typically slower than 20° C. $\min^{-1}$) Thermogravimetric analysis (TGA) and differential scanning calorimetry (DSC) results showed that the polymer-to-ceramic transformations were typically achieved within 300-900° C. (FIG. 8a, b), and the material transformation to ceramics was generated in seconds with a heating rate of 1,000° C. $\min^{-1}$ (FIG. 7b). With method 1, the difference between the thermal expansion behaviors of the UV/ozone film and elastomers led to bending deformation, and the bending stiffness of the ceramic precursors and curvatures of resultant ceramics could be precisely tuned with the depth and width of laser engraving (FIG. 3a). With method 2, since the thermal expansions of different precursors were close (FIG. 8c), the shape transformation resulting from the thermal expansion effect was very limited compared with that from thermal shrinkage during polymer-to-ceramic transformation (FIG. 3b). The influence of the PLE depth of the precursor in method 1 on the curvature of resultant ceramic structures was determined (FIG. 3c), and the finite element analysis (FEA) simulations of thermal expansion effects on bending curvature were consistent with the experimental results (FIG. 3d). The influence of filler concentrations in the precursor in the method 2 on the curvature of the resultant ceramic/glass composite structure was studied, and the FEA simulations of thermal shrinkage effects on bending curvature were consistent with the experimental results (FIG. 3e).

Thermal Expansion-Shrinkage Balance

Figure 3F:
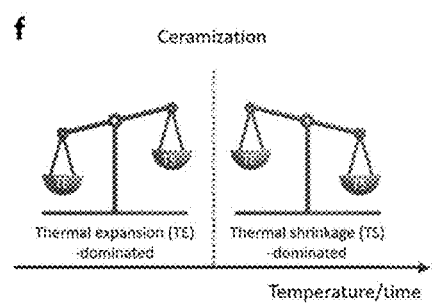

The present invention demonstrates that there exists a balance between thermal expansion and thermal shrinkage accompanying the shape transformation and material transformation process (FIG. 3f). Due to the different thermal expansion and shrinkage behaviors of heterogeneous structural precursors, the ceramic precursor will transform in both shape configuration and material components under thermal treatment. Before the ceramization, the difference in thermal expansion coefficients of different materials in the precursor resulted in a first-state shape transformation. After the ceramization, the differences in the thermal shrinkage ratio for the different materials in the precursor resulted in a second-state shape transformation along with the material transformation. The balance between thermal expansion and shrinkage serves as the mechanism for 4D printing of high-temperature structural materials. With method 1, the thermal expansion effect dominates the shape transformation, whereas with method 2 the thermal shrinkage effect dominates.

Potential Aerospace Applications

Figure 10A:
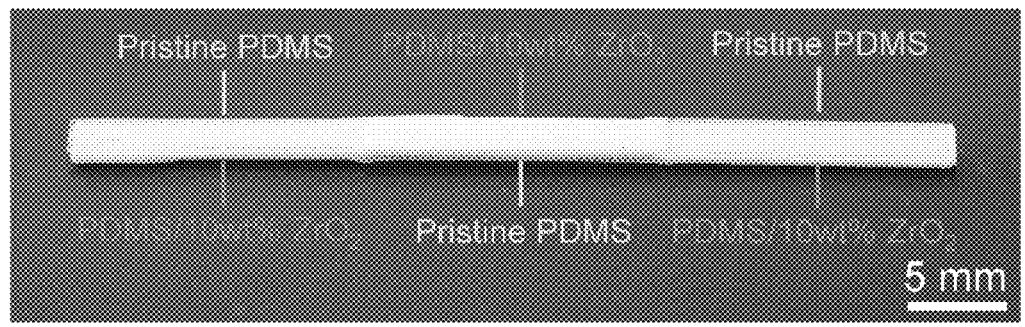
FIGS. 10*a*-10*c* show printed articles.
Figure 10B:
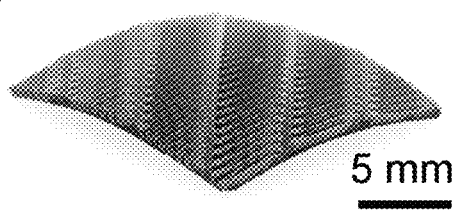
Figure 10C:
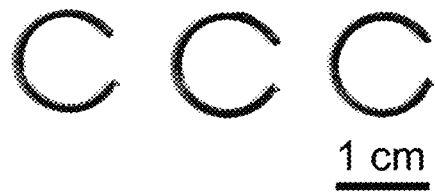
Figure 12A:
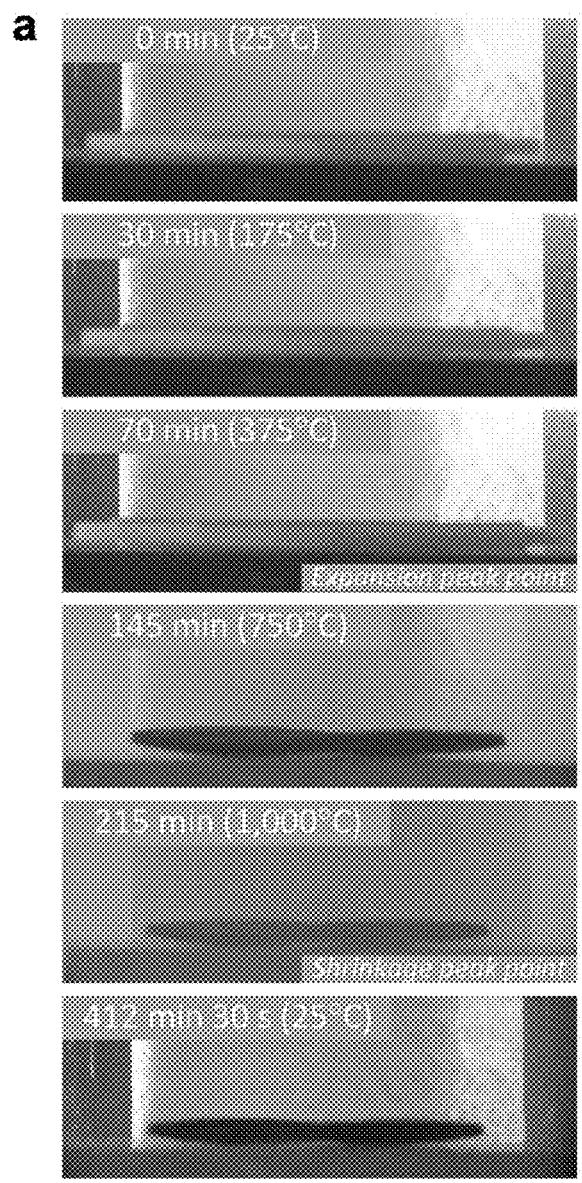
FIGS. 12*a*-12*b* show in situ 4D printing of ceramic/glass composites.
Figure 12B:
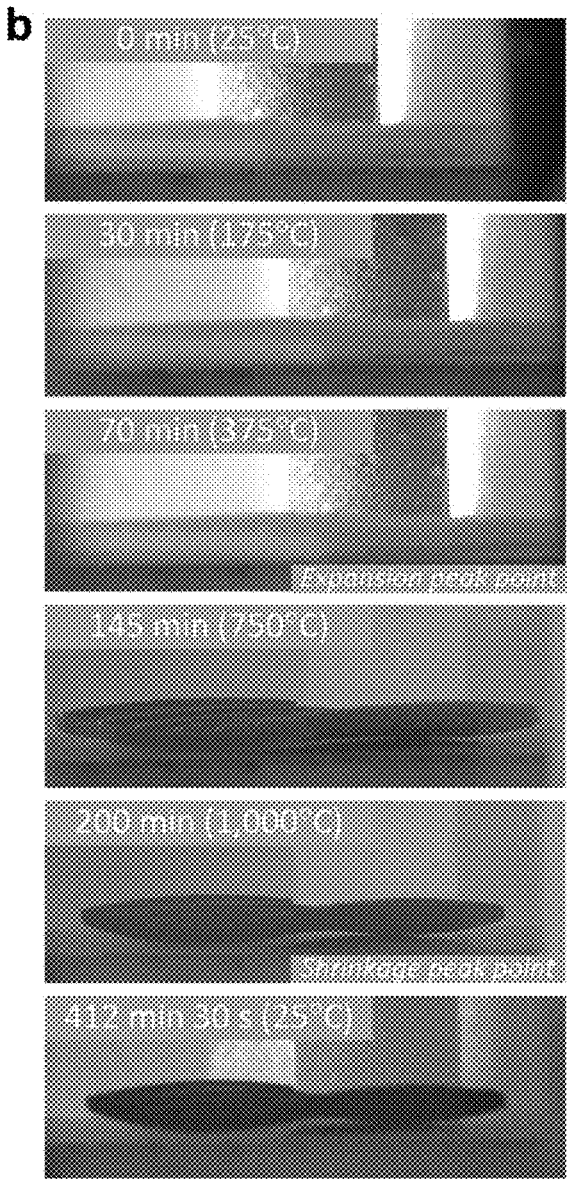

In situ 4D printing can achieve great geometrical flexibility for high-temperature materials, including structures with zero, positive, and negative Gaussian curvature. Demonstrations of 4D printed ceramic/glass composites with a sinusoidal surface (K=0) (FIG. 10a), cap surface (K>0) (FIG. 10b), and saddle surface (K<0) (FIG. 3g and FIG. 12) were carried out. The repeatability of this heterogeneous engineering system was also demonstrated (FIG. 10c). This paradigm offers promising opportunities for high-temperature applications, especially in the field of aerospace. Twelve blades with flat surfaces were simultaneously programmed to achieve twisting deformations, resulting in a flower-like symmetrical structure. The all-ceramic turbine disc and 12 blades were 4D printed in situ as a single piece without an assembly process (FIG. 3h).

The paradigm of in situ 4D printing and integrated shaping for the all-ceramic turbine blisk opens a route to developing advanced and intelligent aerospace propulsion components with high system efficiency, low life-cycle cost, and reduced environmental pollution. Firstly, in situ 4D printing of high-temperature materials of the present invention overcomes severe limitations in building geometrically complex propulsion components with conventional wrought, casting, welding, and subtractive manufacturing. Furthermore, the relatively simple structure of precursors may be utilized for precision machining of complex-shaped high-temperature materials. For example, it would be much easier to polish the flat surface of the blade in FIG. 3h than a curved surface using the PLE method. Secondly, ceramic materials have low density, high hardness, excellent thermal stability, and can work with increased turbine inlet temperature (higher than 1,300° C.), reduced cooling air requirements, and increased combustion efficiency, compared with conventional high-temperature alloys. Thus, the all-ceramic turbine blisk offers the potential for increasing the engine thrust-to-weight ratio and the overall efficiency, accompanied by fuel savings and environmental friendliness. Thirdly, the integrated shaping of the engine turbine disc and blades can reduce assembly time and lifecycle costs, and improve the control of clearances between parts of the propulsion system, which would reduce the vibration, wear, and noise resulting from assembly deviations.

Furthermore, the inventive situ 4D printing can apply to the space exploration industry, in areas such as morphing thermal protection systems, on-orbit manufacturing and repair, and space colonization. The integration of shape and material transformations would offer flexible solutions to the thermal protection system of a reentry vehicle/capsule. With real-time measured information, an optimized thermal protection system with satisfying shape-morphing capability and reliability could be 4D printed in situ in response to the uncertain shape and ever-changing thermal environments of the reentry vehicle/capsule resulting from various factors such as ablation and complex flow effects. In the meantime, compared to the traditional design of heavy thermal shields, the lightweight design would be attractive in consideration of the payload and cost. Moreover, the concept could be used in space for on-orbit manufacturing of ultra-high-performance turbine blades or on-orbit repair (such as additive remanufacturing) of heat shields and other essential parts that could fail during a long-term mission, which would be much faster and cheaper compared to the traditional way since sending anything into orbit or beyond is very expansive, or even impossible for ultra-large-scale components.

Methodology and Advantages

Figure 4A:
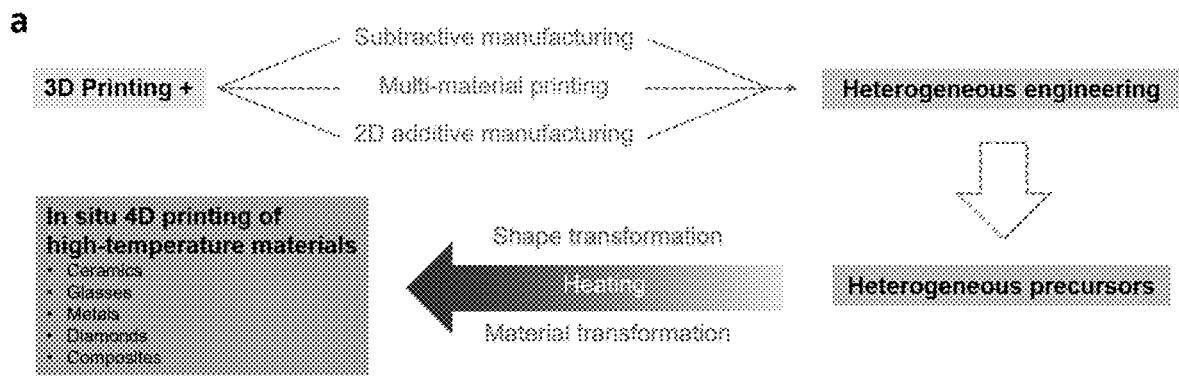
FIGS. 4*a*-4*b* show a methodology (4*a*) and advantages (4*b*) of in situ 4D printing of high-temperature materials.
Figure 4B:
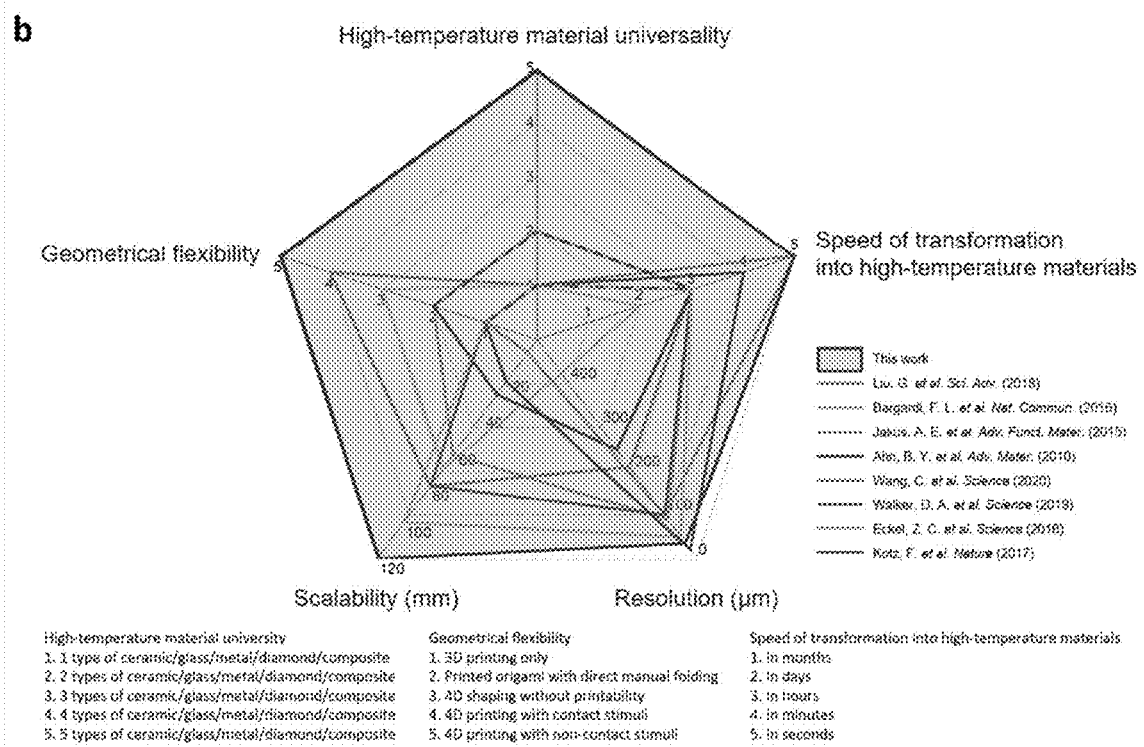

The methodology and advantages of the present invention are illustrated in FIG. 4. High-resolution and scalable hybrid additive-subtractive manufacturing is achieved by the integration of 3D printing with subtractive manufacturing, multi-material printing, and 2D additive manufacturing, resulting in heterogeneous structural precursors. During rapid heating by an induction heating technique or conventional heating by a resistance heating technique, shaping and material transformation can be observed in situ, leading to the in situ 4D printing of high-temperature materials, including ceramics, glasses, metals, diamonds, and composites (FIG. 4a). Compared with prior methods, the present invention enables breakthroughs in material universality, geometrical flexibility, scalability, resolution, and speed of transformation into high-temperature materials (FIG. 4b). The technique of the present invention can be applied to ceramic/glass/metal/diamond/composites, whereas most previous works on the additive manufacturing of high-temperature structural materials were applicable to only one type or two types of ceramic/glass/metal/diamond materials. Meanwhile, the present invention demonstrates 4D printing with non-contact stimuli, in contrast to other works of 4D printing with contact stimuli, 4D shaping with cast molding, printed origami with direct manual folding, and 3D printing only. Furthermore, the present invention can achieve large scalability (above 12 cm), high resolution (as high as 35 µm), and fast speed of transformation into high-temperature materials (in seconds).

EXAMPLE

Preparation of Materials

For ceramic materials, the polymeric ceramic precursor with ceramic particles ink included poly(dimethylsiloxane) (PDMS, SE1700, Dow Corning) and $ZrO_2$ nanoparticles (20-50 nm, TONG LI TECH CO LTD). Either 10 wt % or 20 wt % $ZrO_2$ nanoparticles were added in liquid PDMS, and mixed by triple roller mills (EXAKT). Afterwards, the ink was poured into a syringe and centrifuged. For SiOC glass materials, an ink of liquid PDMS was poured into a syringe and centrifuged. For Fe alloy materials, an ink included iron powder (5-9 µm, Strem Chemicals, Inc.) and a cellulose binder (Shanghai Macklin Biochemical Co., Ltd.). The amount of iron powder was 70 wt %. Fe alloys were obtained by heating dried precursors to 800° C. for 2 hours, followed by cooling to ambient temperature in a resistance heating furnace with an argon flow of 200 mL $min^{-1}$. The heating and cooling rates were 5° C. $min^{-1}$ and 10° C. $min^{-1}$, respectively. For diamond materials, diamond particles (80 µm) were purchased from Tianjian Carbon Material Co., Ltd., China. Acrylic acid ammonium salt polymer (≥99%) was purchased from Kaima Biochemical Co., Ltd., China. Acrylamide (≥99%) was purchased from Sigma-Aldrich. 2-Hydroxy-2-methylpropiophenone (Irgacure 1173, ≥99%), and N,N'-Methylenebisacrylamide (Bis-acrylamide, ≥99%) were purchased from J&K Scientific. All materials were used as supplied. First, a 30 wt % acrylamide solution was prepared. Irgacure-1173, bis-acrylamide and acrylic acid ammonium salt polymer were then added, with their respective weights determined based on the desired diamond weight. The mixed slurry was stirred with a magnetic mixer (MS-H340-S4, DLAB, China) at 500 rpm for 10 minutes. After that, the slurry was poured into a printing syringe or a prefabricated silicone mold and irradiated by UV radiation with a wavelength of 365 nm for 30 minutes. The prepared diamond based composite samples (green bodies) were placed into an oven at 80° C. for 3 hours. Then the dry green bodies were heated to a predetermined temperature, based on the carbonization degree required, at a ramp rate of 5° C. $min^{-1}$ and left to dwell for 5 hours. Finally, they were cooled to room temperature still at a ramp rate of 5° C. $min^{-1}$ The entire sintering process was carried out in argon with a flow rate of 100 mL $min^{-1}$.

In Situ 4D Printing

For the bending of heterogeneous ceramic precursors in the induction heating process with method 1, as shown in FIG. 1a, FIG. 3a, and FIG. 3c, 3D printing of solid precursors (22 mm×2 mm×0.8 mm) with the ink of PDMS/10 wt % $ZrO_2$ was conducted using a direct ink writing machine (Regenovo Biotechnology Co., Ltd.). The printed precursors were cured at 150° C. for 30 minutes in an oven. The cured precursors were laser-engraved to generate 11 evenly distributed grooves on their top surfaces with a $CO_2$ laser machining equipment (Epilog). The width of each groove was 1 mm, and their depths were 100, 200, 300, 400, and 500 μm. Then the samples were flipped and exposed with UV/ozone treatment for 8 hours. The heterogeneous ceramic precursors were heated to 1,300° C. within 12 minutes in an induction heating furnace with an argon flow of 200 mL $min^{-1}$, followed by holding at 1,300° C. for 10 minutes.

For the bending of heterogeneous ceramic/glass precursors in the induction heating process with method 2, as shown in FIG. 1a, FIG. 3b, and FIG. 3d, solid precursors (30 mm×2 mm×0.4 mm) with the inks of glass precursor (pristine PDMS) and ceramic precursor (PDMS/10 wt % $ZrO_2$ or PDMS/20 wt % $ZrO_2$) were 3D printed. The samples included two layers, and each layer with a height of 0.2 mm was printed with the glass or ceramic precursor. For the top sample in FIG. 3e, the top and bottom layers of the corresponding heterogeneous precursor were pristine PDMS and PDMS/20 wt % $ZrO_2$, respectively. For the bottom sample in FIG. 3e, the top and bottom layers of the corresponding heterogeneous precursor were pristine PDMS and PDMS/10 wt % $ZrO_2$, respectively. The printed precursors were cured at 150° C. for 30 minutes in an oven. The heterogeneous ceramic/glass precursors were heated to 1,300° C. within 12 minutes in an induction heating furnace with an argon flow of 200 mL $min^{-1}$, followed by holding at 1,300° C. for 10 minutes.

Figure 3G:
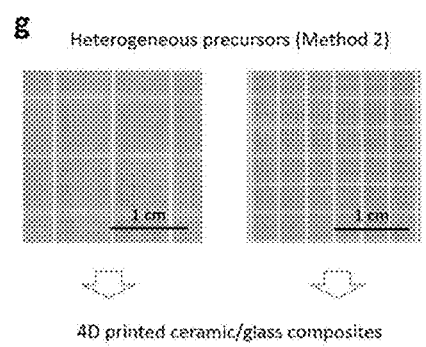
Figure 3G:
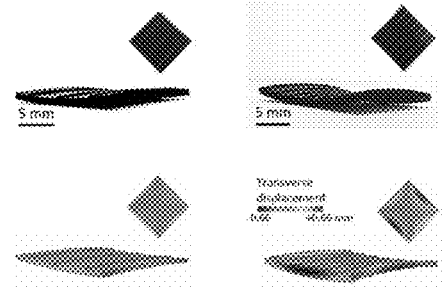
Figure 3H:
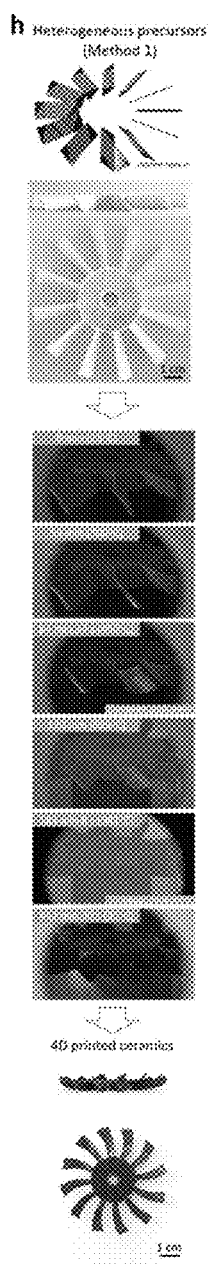
Figure 3I:
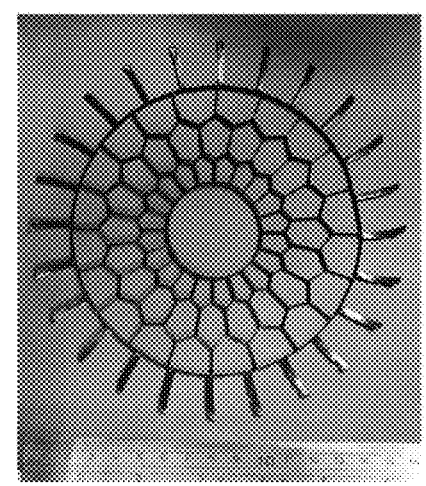
Figure 11A:
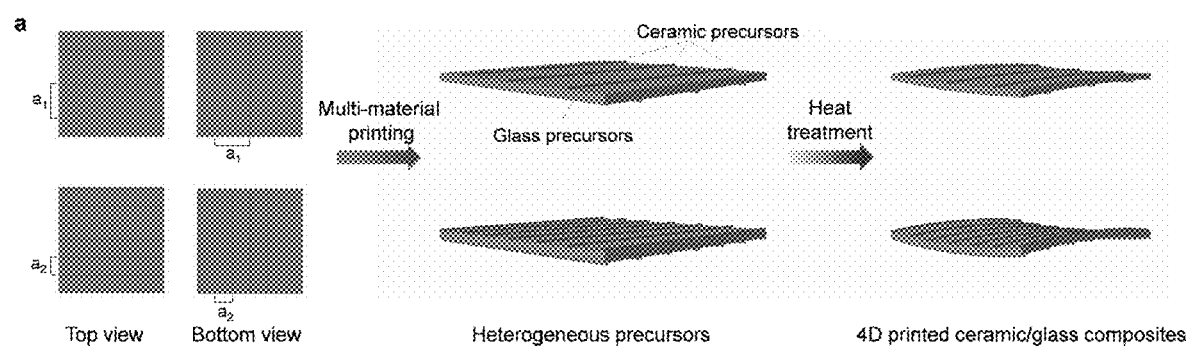
FIG. 11*a* is a schematic depiction of 4D printing of a ceramic/glass composite saddle surface via method 2. Definitions of important geometric parameters: $a_1$=7.5 mm; $a_2$=3.75 mm

For the 4D printing of ceramic/glass composite saddle surfaces in the resistance heating process, as shown in FIG. 3g, solid precursors (23 mm×23 mm×0.8 mm) with the ink of pristine PDMS were 3D printed and then cured as the middle layers of the heterogeneous precursors. Patterns with a height of 0.2 mm were printed and then cured on both the top and bottom surfaces of the prepared solid precursors with the ink of PDMS/20 wt % $ZrO_2$, as shown in FIG. 11a. The well-prepared heterogeneous ceramic/glass precursors were heated to 1,000° C. for 2 hours followed by cooling to ambient temperature under vacuum in a resistance heating furnace, at heating and cooling rates of 5° C. $min^{-1}$ and 10° C. $min^{-1}$, respectively.

Figure 11B:
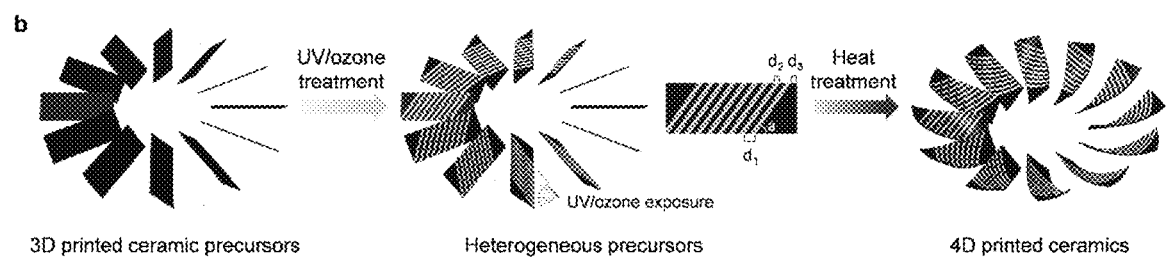
FIG. 11*b* is a schematic depiction of 4D printing and integrated shaping for an all-ceramic turbine blisk. Definitions of important geometric parameters: $d_1$=2 mm; $d_2$=1 mm; $d_3$=1.1 mm; α=55°.

For 4D printing and integrated shaping for the all-ceramic turbine blisk, as shown in FIG. 3h, a sample of an engine turbine disc (6.4 mm in height; 40 mm and 16 mm in diameter for the outer and inner circles, respectively) with 12 blades (24 mm×9 mm×0.4 mm) was 3D printed. The surface of each blade was flat and intersected the ground at 45°. Then each blade was selectively exposed to UV/ozone treatment for 16 hours by masking the surface with a laser cut paper, as shown in FIG. 11b. The heterogeneous ceramic precursors were heated to 1,000° C. for 2 hours, followed by cooling to ambient temperature under vacuum in a resistance heating furnace. The heating and cooling rates were 5° C. $min^{-1}$ and 10° C. $min^{-1}$, respectively.

Characterization

Scanning electron microscopy (SEM, Nova-Nono430, FEI) was used to characterize the structures of Fe alloys, diamonds, and the UV/ozone film on the surface of ceramic precursors. The average composition of high-temperature materials was measured by EDS. Transmission electron microscopy (TEM, Titan Themis 200/Strata 400S, FEI) was used to characterize the amorphous-crystalline dual-phase structure of ceramics and amorphous structure of SiOC glass. Focused ion beam (FIB, 4505/talos F200, FEI) was used to prepare samples for TEM. The crystal structures of Fe alloys and diamonds were analyzed by X-ray diffraction (XRD, SmartLab, Rigaku). Optical profiler measurements (NPFLEX, Bruker) were applied on the laser-engraved samples to obtain the corresponding 3D morphology information. Tension tests (Testpilot-10, Wance) of precursors were performed with 3D printed solid samples (75 mm×10 mm×1 mm), and the displacement rate was 5 mm $min^{-1}$ Nanoindentation tests (Hysitron TI980, Bruker) were performed on the surface of UV/ozone film to obtain its modulus for the FEA simulation.

To analyze the thermal decomposition process of the precursors, thermogravimetric analysis (TGA, Pyris 1 TGA, Perkin Elmer) and differential scanning calorimetry (DSC, Diamond DSC, Perkin Elmer) tests were performed at a heating rate of 106° C. $min^{-1}$ under a nitrogen flow of 50 mL $min^{-1}$ Thermal expansion tests (DIL402C, NETZSCH) of precursors were performed with 3D printed solid samples (20 mm×20 mm×4 mm), and the samples were heated to 300° C. at a heating rate of 5° C. $min^{-1}$.

Simulation

Figure 9A:
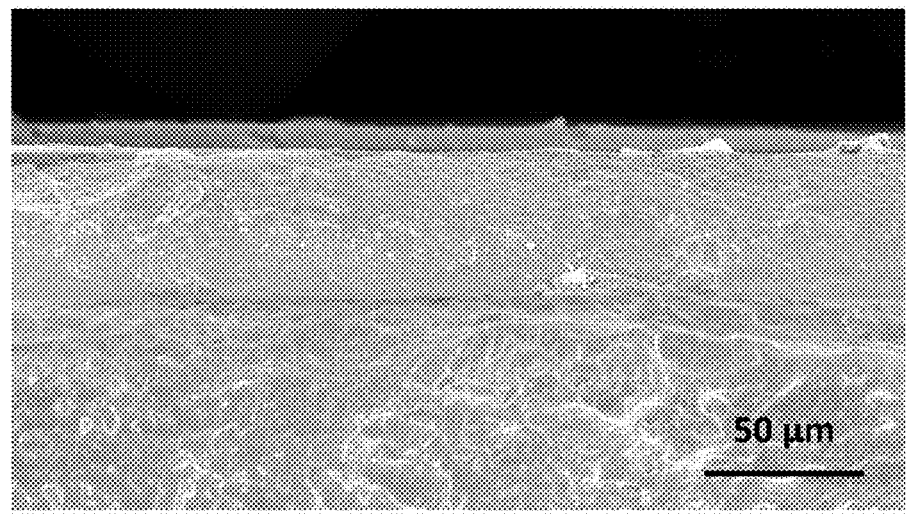
FIGS. 9*a*-9*b* show SEM images (9*a*) and nanoindentation tests (9*b*) of the UV/ozone film on the ceramic precursors indicating the corresponding film thickness and young's modulus.
Figure 9B:
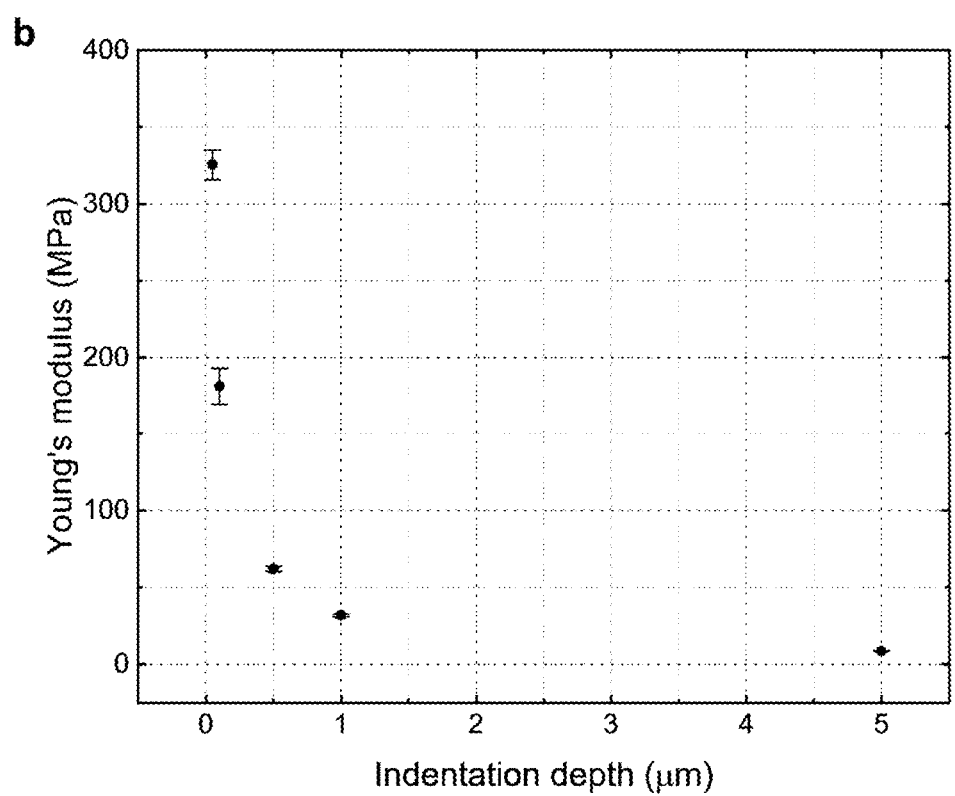

Finite element analysis (FEA) was performed to explore the deformation behavior during thermal expansion or thermal shrinkage using the commercial software ABAQUS (2016). The UV/ozone film was modeled as elastic shells. The precursor and UV/ozone film were assumed to be an incompressible neo-Hookean material and elastic material, respectively. The mechanical properties and dimensions of the structures were consistent with the experimental measurements. The linear thermal expansion coefficients of pristine PDMS, PDMS/10 wt % $ZrO_2$, and PDMS/20 wt % $ZrO_2$ before transforming into glass/ceramics were set as $303 \times 10^{-6}$, $283 \times 10^{-6}$, and $291 \times 10^{-6 \circ}$ $C.^{-1}$, respectively, according to thermal expansion tests in FIG. 8c. The moduli of pristine PDMS, PDMS/10 wt % $ZrO_2$, and PDMS/20 wt % $ZrO_2$ were set as 1.61 MPa, 1.14 MPa, and 1.56 MPa, respectively, according to tension tests in FIG. 8d. The region of 0-10% strain in the loading process was applied to obtain the corresponding Young's modulus. The thickness of UV/ozone film with the exposure of 8 hours was set as 33 μm according to SEM results in FIG. 9a, and its modulus was set as 13 MPa according to nanoindentation results in FIG. 9b. The modulus of the equivalent film was calculated by assuming that the cross sections had the same tensile stiffness. The linear shrinkage values of pristine PDMS, PDMS/10 wt % $ZrO_2$, and PDMS/20 wt % $ZrO_2$ during polymer-to-glass/ceramic transformations with induction heat treatment were set as 14%, 12%, and 11%, respectively, according to testing the results under the same conditions with heterogeneous samples in FIGS. 3a and 3b. The linear shrinkage values of pristine PDMS and PDMS/20 wt % $ZrO_2$ during polymer-to-glass/ceramic transformations with resistance heat treatment were set as 20% and 16%, respectively, according to the testing results under the same conditions with heterogeneous samples in FIG. 3g. For method 1, the thermal expansion of precursors dominated the shape transformation. Thus, thermal expansion was only considered during simulations based on method 1. For method 2, since the thermal expansions of different precursors were very close, the thermal shrinkage dominated the shape transformation, and we neglected the effect of thermal expansion in FEA simulations.

INDUSTRIAL APPLICABILITY

The above-mentioned hybrid additive-subtractive manufacturing system may be utilized to develop rapid, precise, and scalable manufacturing of high-temperature materials, by increasing the 3D printing efficiency from line-by-line printing to sheet-by-sheet printing. With the further integration of hybrid manufacturing and origami/kirigami folding, an origami/kirigami-inspired 4D printing strategy would provide a new pathway towards complicated shaping of high-temperature materials. The possibility of developing precursors with shape memory behaviors and implementing control with different external stimuli (such as magnetic fields, pneumatic deformations, chemical reactions, or their combinations) for in situ 4D printing of high-temperature materials offers versatility in tackling the challenges of applying structural materials in various sophisticated and demanding working environments. Furthermore, attempts at improving the toughness of ceramic materials by heterogeneous engineering of the soft/rigid hybrid ceramic precursor/ceramic material systems could be anticipated in the future.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A method of in situ 4D printing of high-temperature materials, the method comprising:
   3D printing a structure of a material comprising an ink including a precursor;
   treating the structure with oxygen, ozone, UV with oxygen, or UV with ozone to create a heterogeneous precursor,
   wherein a treated portion of heterogeneous precursor has a different coefficient of thermal expansion or a different thermal shrinkage ratio from a remaining portion of the heterogeneous precursor;
   heating the heterogeneous precursor wherein a difference in the coefficient of thermal expansion or the thermal shrinkage ratio between the treated portion of the heterogeneous precursor and a remaining portion of the heterogeneous precursor creates an interface stress to cause a selected level of deformation.

2. The method of claim 1, wherein the ink includes polymers, or mixtures of polymers and particles.

3. The method of claim 1, further comprising removing a portion of the structure to create a shaped structure prior to or after treating.

4. The method of claim 1, wherein the heating is performed by induction heating, resistance heating, or combinations thereof.

5. The method of claim 1, wherein the precursor is selected from a poly(dimethylsiloxane), polysiloxane, a polyborosiloxane, a polycarbosiloxane, a polysilazane or a poly(organosilylcarbodiimide), cellulose, hydrogels, or combinations thereof.

6. The method of claim 2, wherein the particles are selected from one or more of ceramic particles, metal particles, diamond particles, or glass particles.

7. The method of claim 6, wherein the particles are ceramic particles selected from one or more of alumina ($Al_2O_3$), zirconia ($ZrO_2$), titania ($TiO_2$), silicon nitride ($Si_3N_4$), calcium oxide (CaO), silicon carbide (SiC), yttria ($Y_2O_3$), or aluminum nitride (AlN) particles.

8. The method of claim 6, wherein the particles are metal particles and are selected from one or more of iron (Fe), titanium (Ti), or nickel (Ni) particles.

9. The method according to claim 2, wherein the particle size ranges from approximately 1 nm to 100 microns.

10. The method of claim 1, wherein the 3D printing is selected from extrusion, material jetting, photopolymerization, powder bed fusion or combinations thereof.

11. The method of claim 3, wherein removing a portion of the structure is by controlled laser beams.

12. The method of claim 3, wherein removing a portion of the structures is by electron beam, high pressure liquids, or other controlled high energy flow, or combinations thereof.

13. The method of claim 1, further comprising physical vapor deposition, chemical vapor deposition, atomic layer deposition or combinations thereof.

14. The method of claim 1, wherein the selected deformation is positive, negative, or zero Gaussian curvature or combinations thereof.

* * * * *